United States Patent Office 2,759,875
Patented Aug. 21, 1956

2,759,875

REFINING MINERAL OIL TO REMOVE COPPER THEREFROM BY TREATING WITH A METAL ACETATE

Rolland G. Bowers, Toledo, Ohio, assignor to Sun Oil Company, Philadelphia, Pa., a corporation of New Jersey No Drawing. Application November 28, 1951,
Serial No. 258,745

9 Claims. (Cl. 196—29)

This invention relates to the refining of mineral oil, and more particularly to stabilization of mineral oil materials containing copper.

Many petroleum distillates and products, including for example petroleum spirits, gasoline, kerosene, furnace oils, diesel oils, and fractions suitable for use as paint or varnish solvents, contain copper and other injurious metallic impurities which may originate from the crude oil as received, or from the equipment embodying many metallic alloys, or from chemical treatment of the oils during processing, e. g. from copper treating operations as subsequently described.

For example, furnace oils have been found to contain metals and their compounds which accelerate the formation of sludge in storage tanks. The sludge may be present either in suspension or as a precipitate and often results in clogged filters or nozzles in domestic oil burners. Blended diesel oils are affected in a similar manner particularly when used in locomotives where aging conditions are accelerated by high storage temperatures and agitation in partially filed tanks venting to the atmosphere. The present invention has been found to be advantageous in remedying the above-described conditions because of the elimination of impurities causing accelerated aging of the finished products.

In one embodiment, the present invention involves the stabilization of light mineral distillates which have been previously treated with a copper-containing reagent. Treating of light petroleum distillates, e. g. straight-run or cracked gasoline or kerosene, by contact with copper-containing reagents is a frequently practiced operation in mineral oil refining. The purpose of such treating is to "sweeten" the distillate, i. e. to remove or convert into less objectionable compounds, certain impurities, e. g. sulfur compounds such as mercaptans, thiophenes, sulfides, etc., which tend to make the distillate, as obtained from the distillation tower, "sour," i. e. malodorous and corrosive.

Commonly used copper-containing reagents for such sweetening operations include cupric chloride, cupric sulfate, etc., either alone or mixed with alkali metal chloride or alkaline earth metal chloride. The sweetening operation can be conducted by contacting the distillate in liquid phase with an aqueous solution of the copper-containing reagent, or by percolating the distillate in liquid phase through a bed of solid adsorbent carrier material impregnated with the copper-containing reagent, or by any other suitable method.

The mineral oil product obtained by such sweetening, though it no longer contains substantial amounts of the original harmful impurities, nevertheless is frequently not satisfactory in properties. Often the copper-treated distillate is unstable and tends to discolor or to undergo gum or resin formation in storage. It is believed that such instability is attributable to the fact that the copper-treated distillate contains sufficient amounts of oil-soluble copper compounds, e. g. copper naphthenates, copper mercaptides, etc., to catalyze the reactions tending to cause discoloration and resin and gum formation.

I have discovered that hydrocarbon material, which has previously been treated with a copper-containing reagent, or contains copper from other sources, can be effectively stabilized by contacting such material in liquid phase with an aqueous solution of an acetate salt having a cation above hydrogen in the electromotive series of the elements. Contacting as described above reduces or eliminates the tendency of copper-containing distillates to discolor on standing. Such contacting is particularly advantageous in that, upon separation of the distillate from the solution, no precipitates remain dispersed in either the distillate or the solution. In prior art stabilizations of copper-sweetened distillates by contact with aqueous solutions of inorganic sulfide and carbonate salts, precipitates generally become disadvantageously dispersed in the products of the stabilization, and these precipitates favor the formation of emulsions and make it difficult to break such emulsions and separate the products.

According to the present invention, a copper-containing distillate is contacted with an aqueous solution of an acetate salt having a cation, e. g. lithium, potassium, sodium, strontium, manganese, zinc, chromium, barium, calcium, magnesium, aluminum, iron, cadmium, cobalt, nickel, or lead, above hydrogen in the electromotive series of the elements. Ferrous salts have been found particularly suitable for use according to the invention.

Aqueous solutions used according to the present invention preferably have pH above 4, in order that the solution is not disadvantageously corrosive. When solutions of iron acetate are used, the solutions are preferably acidic in order to avoid the formation of ferric basic acetate, which is insoluble in water and if it were present would cause the treating agent to be a suspension, rather than a solids-free solution. In cases where it is desired to add a phenolic oxidation inhibitor, for example, to the distillate before stabilization according to the invention, and in cases where the distillate contains natural oxidation inhibitors of the type which reacts with aqueous alkaline materials, it is particularly desirable to use an acidic treating solution in the stabilization, because acidic treating solutions do not react with such oxidation inhibitors, whereas an alkaline solution does. Iron acetate solutions, for example, prepared by dissolving iron acetate in water, are acidic in reaction, and can be used directly after preparation according to the present invention.

Contacting of copper-containing distillate and aqueous solution according to the invention is preferably conducted at ordinary or slightly elevated temperature, using elevated pressure if necessary to maintain the distillate substantially all in liquid phase. When the solute used is iron, aluminum, or chromium, elevated temperatures are preferably not used, since such temperatures favor formation of insoluble basic acetates of those metals.

The method of contacting copper-containing distillate with aqueous solution according to the invention can be any suitable method for achieving intimate contact. For example, the distillate can be agitated with a body of the solution to form a mixture of distillate and solution, with subsequent separation of the mixture into an aqueous layer and a stabilized distillate layer. Alternatively, the distillate can be introduced beneath the surface of a body of the solution and allowed to rise to the surface and to accumulate there as a readily removable stabilized distillate layer. As another alternative, the distillate can be percolated through a bed of particles of inert adsorbent carrier material, e. g. fullers earth, charcoal, pumice, etc., impregnated with aqueous solution according to the invention. Impregnation of the carrier material can be accomplished, for example, by spraying the solution thereon, or by any other suitable means.

The concentration of salt in solutions used according to the invention can vary. Generally, it is preferred that the solution contain at least 0.5 weight percent salt, more preferably at least 10 weight percent. The upper limit of concentration is the saturation concentration of the salt.

The time of contact between distillate and solution is not critical; generally there is no necessity for prolonging the contact time beyond the period needed to obtain intimate contact.

Since the amounts of copper which are removed from distillates according to the invention are relatively small, the life in service of the aqueous solutions used is relatively quite long, and it is therefore generally not necessary to regenerate the solution.

The following example illustrates the invention:

A gasoline distillate is sweetened by contact with a copper-containing compound in a conventional manner, involving passage of the gasoline distillate through a bed of solid adsorbent impregnated with aqueous cupric chloride solution, the sweetening being performed in the presence of free oxygen-containing gas whereby the mercaptans in the distillate are converted to disulfides, and cuprous chloride formed in the process is re-oxidized to cupric chloride. The resulting gasoline distillate contains sufficient copper to be disadvantageously unstable and subject to deterioration through oxidation. In order to correct this condition, the distillate is further treated with an aqueous solution of ferrous acetate, prepared by dissolving ferrous acetate in water to obtain an 0.5 molar solution having a pH of about 6. The gasoline distillate is intimately contacted with the solution, and the resulting mixture is then allowed to separate into layers. A sharp separation of the layers is obtained. The gasoline layer obtained is substantially free from copper and, without requiring any subsequent filtration, is highly satisfactory in stability and resistance to deterioration through oxidation.

This example shows that ferrous acetate solution is a superior reagent for stabilization of mineral oil distillates. Instead of ferrous acetate solution, solutions of other salts, e. g. sodium acetate, lead acetate, chromium acetate, potassium acetate, etc., within the scope of the invention can be used.

The invention claimed is:

1. In the method of refining hydrocarbon material which comprises contacting hydrocarbon material with a copper salt selected from the group consisting of cupric chloride and cupric sulfate, thereby to oxidize sulfur-containing constitutents of the hydrocarbon material and reduce the copper salt, and oxidizing the reduced copper salt by means of free oxygen-containing gas, the improvement which comprises contacting the resulting hydrocarbon material containing organic copper compounds, in liquid phase with an aqueous solution of an acetate salt having a cation above hydrogen in the electromotive series of the elements, thereby to remove copper compounds from the hydrocarbon material.

2. Method according to claim 1 wherein said salt is ferrous acetate.

3. Method according to claim 2 wherein said solution is acidic and has pH greater than 4.

4. Method according to claim 1 wherein said salt is iron acetate.

5. Method according to claim 1 wherein said salt is sodium acetate.

6. Method according to claim 1 wherein said salt is potassium acetate.

7. Method according to claim 1 wherein said salt is aluminum acetate.

8. Method according to claim 1 wherein said salt is ferric acetate.

9. Method according to claim 1 wherein said hydrocarbon material contains a phenolic oxidation inhibitor, wherein said salt is ferrous acetate, and wherein said solution is acidic and has pH greater than 4.

References Cited in the file of this patent

UNITED STATES PATENTS

| | | |
|---|---|---|
| 723,368 | Colin et al. | Mar. 24, 1903 |
| 2,227,089 | Hopper | Dec. 31, 1940 |
| 2,413,009 | Taussky | Dec. 24, 1946 |

FOREIGN PATENTS

| | | |
|---|---|---|
| 518,593 | France | June 4, 1919 |